Patented Aug. 11, 1953

2,648,701

UNITED STATES PATENT OFFICE 2,648,701

ESTERS OF 4-CHLORO-o-TOLOXYACETIC ACID

Louis E. Begin, Midland, Mich., assignor to The Dow Chemical Company, Midland, Mich., a corporation of Delaware No Drawing. Application September 18, 1951, Serial No. 247,190

5 Claims. (Cl. 260—473)

1

The present invention relates to esters of 4-chloro-o-toloxyacetic acid and is particularly concerned with compounds having the formula

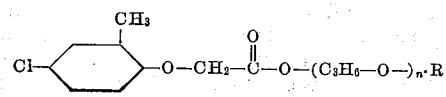

wherein $n$ is an integer not greater than 3, and R represents a member of the group consisting of alkyl and phenyl. These compounds are adapted to be employed as modifiers in plastic compositions; preservatives for paper, wood and cellulosic textiles; and plant growth control materials.

The new esters are oily liquids, somewhat soluble in many organic solvents, and substantially insoluble in water. These compounds are stable to light and air, not appreciably affected by carbon dioxide, noncorrosive to the skin of man and higher animals, and of low volatility.

The compounds may be prepared by reacting a molecular proportion of (1) 4-chloro-o-toloxyacetic acid with (2) at least a molecular proportion of a mono-ether of mono-, di-, or tripropylene glycol such as methoxy-propanol, ethoxy-propanol, propoxy-propanol, butoxy-propanol, hexoxy-propanol, nonyloxy-propanol, phenoxy-propanol, methoxy-propoxy-propanol, ethoxy-propoxy-propanol, propoxy-propoxy - propanol, butoxy-propoxy-propanol, hexoxy-propoxy-propanol, nonyloxy-propoxy-propanol, phenoxy-propoxy-propanol, methoxy-propoxy - propoxy-propanol, butoxy-propoxy-propoxy - propanol, nonyloxy-propoxy-propoxy-propanol and phenoxy-propoxy-propoxy-propanol. Good yields are obtained when a small excess of ether-alcohol is employed, and the water of reaction is removed as formed. The reaction is carried out in the presence of an esterification catalyst, such as sulphuric acid or phenol sulphonic acid.

In one method of carrying out the reaction, the 4-chloro-o-toloxyacetic acid, a small molecular excess of the propylene glycol mono-ether, and the catalyst are mixed together and heated for a period of time at a temperature of from 80° to 150° C. The heating is carried out under reduced pressure to remove water of reaction together with some of the excess of the ether alcohol. When the reaction has approached completion, ethylene dichloride, carbon tetrachloride or other water-immiscible solvent may be added to the mixture and the catalyst and any unreacted 4-chloro-o-toloxyacetic acid neutralized with an alkali such as dilute aqueous sodium carbonate or ammonium bicarbonate. The resulting mixture divides into aqueous and solvent layers. The solvent layer, which contains the ester reaction product, is separated and washed several times with water. The solvent is then removed by distillation under reduced pressure to obtain the desired ester compound.

In an alternative procedure, the reaction is carried out in a water-immiscible solvent, such as ethylene dichloride. The reactants and catalyst are dispersed in the solvent and heated together for a period of time at a temperature of from 80° to 150° C. A mixture of the solvent and water of reaction is continuously distilled out of the reaction vessel, condensed, and the solvent recovered. Additional solvent is introduced into the reaction zone as may be necessary. Upon completion of the reaction, the mixture may be neutralized, as with dilute aqueous sodium carbonate, and the solvent layer separated from the aqueous layer and washed several times with water. The solvent is then removed by distillation under reduced pressure to obtain the ester product.

The mono, di-, and tripropylene glycol mono-ethers employed as starting materials may be obtained by the reaction of propylene oxide with a monohydric aliphatic alcohol or phenol. The reaction is carried out in the presence of a catalyst such as sulphuric acid or sodium hydroxide. In one method of preparing the ether-alcohols, the reactants are mixed and heated together in the presence of the catalyst for ½ hour or longer at a temperature of 170° C. and a pressure of 200 pounds per square inch. The mixed reaction product may then be employed as the mono-ether starting material or the individual ether-alcohols separated by subjecting the mixed reaction products to fractional distillation under reduced pressure.

The following examples illustrate the invention but are not to be construed as limiting the same:

Example 1

200.5 grams (1 mole) of 4-chloro-o-toloxyacetic acid, 177 grams (1 mole) of isopropoxy-propoxy-propanol (boiling at 204° C. at 760 millimeters pressure), 250 milliliters of ethylene dichloride and 1 milliliter of sulphuric acid were heated together for 4 hours at a pot temperature of 103° C. The operation was carried out with continuous distillation of ethylene dichloride together with the water of reaction as formed, separation of the water, and recycling of ethylene dichloride. Upon completion of the reaction, the mixture was neutralized with dilute aqueous sodium carbonate. The solvent and aqueous layers were separated and the solvent layer washed with water to extract water soluble salts of catalyst and unreacted 4-chloro-o-toloxyacetic acid. The ethylene dichloride was then removed by distillation at reduced pressure to obtain an isopropoxy - propoxy - propyl 4-chloro-o-toloxyacetate product. The latter was an oily liquid having a refractive index $n/D$ of 1.4882 at 25° C. and a chlorine content of 10.2 percent as compared to a theoretical chlorine content of 9.96 percent.

*Example 2*

200.5 grams (1 mole) of 4-chloro-o-toloxyacetic acid, 206 grams (1 mole) of methoxy-propoxy-propoxy-propanol (boiling at 247° C. at 760 millimeters pressure), 200 milliliters of ethylene dichloride and 1 milliliter of sulphuric acid were heated together for 2 hours at a pot temperature of 105° C. The operation was carried out with continuous distillation of ethylene dichloride together with the water of reaction as formed, separation of the water, and recycling of ethylene dichloride. Upon completion of the reaction, the mixture was neutralized with dilute aqueous sodium carbonate. The solvent and aqueous layers were separated and the solvent layer washed with water. The ethylene dichloride was then separated by distillation at reduced pressure to obtain a methoxy-propoxy-propoxy-propyl 4-chloro-o-toloxyacetate product as an oily liquid having a refractive index $n/D$ of 1.4880 at 25° C.

*Example 3*

200.5 grams (1 mole of 4-chloro-o-toloxyacetic acid, 90 grams (1 mole) of 1-methoxy-2-propanol (boiling at 118° C. at 760 millimeters pressure) 250 milliliters of ethylene dichloride and 1 milliliter of sulphuric acid were reacted together by the method of Example 1 to obtain a 1-methoxy-2-propyl 4-chloro-o-toloxyacetate product. The latter was an oily liquid having a refractive index $n/D$ of 1.5060 at 250° C.

*Example 4*

4078 grams (20.3 moles) 4-chloro-o-toloxyacetic acid, 3857 grams (20.3 moles) of butoxy-propoxy-propanol (boiling at 228° C. at 760 millimeters pressure), 2900 milliliters of ethylene dichloride and 10 milliliters of sulphuric acid were mixed together and heated over a period of about 2 hours at temperatures gradually increasing up to a temperature of 83° C. An additional 10 milliliters of sulphuric acid was then added to the reaction zone and heating thereafter continued for about 7 hours at a head temperature of from about 77 to 85° C. The operation was carried out with continuous distillation of ethylene dichloride together with the water of reaction as formed, separation of the water and recycling of the ethylene dichloride. Upon completion of the reaction, the reaction mixture was neutralized with triethanolamine and the ethylene dichloride thereafter removed by distillation to obtain a butoxy-propoxy-propyl 4-chloro-o-toloxyacetate product. The latter was a viscous oil having a refractive index $n/D$ of 1.4868 at 25° C.

*Example 5*

2609 grams (18 moles) of 4-chloro-o-toloxyacetic acid, 3780 grams (18 moles) of phenoxy-propoxy-propanol (boiling at 285.7° C. at 760 millimeters pressure), 300 milliliters of ethylene dichloride and 10 milliliters of sulphuric acid were mixed together and heated for about 13 hours at a pot temperature of from about 95° to 100° C. The operation was carried out with continuous distillation of ethylene dichloride together with the water of reaction as formed, separation of the water and recycling of the ethylene dichloride. Upon completion of the reaction, the reaction mixture was neutralized with dilute aqueous sodium carbonate. The solvent and aqueous layers were then separated and the solvent layer washed several times with water. The ethylene dichloride was then removed by distillation under reduced pressure to obtain a phenoxy-propoxy-propyl 4 - chloro-o-toloxyacetate product. The latter was a viscous oil having a refractive index $n/D$ of 1.5302 at 25° C.

*Example 6*

5086 grams (25.36 moles) of 4-chloro-o-toloxyacetic acid, 4086 grams (26.7 moles) of a mixed polypropylene glycol butyl ether (having an average molecular weight of 153 and containing 72 percent of 1-butoxy-2-propanol, 20 percent of butoxy-propoxy-propanol and 8 percent of the butyl ethers of tri- and higher polypropylene glycols) and 39 grams of phenol sulphonic acid were mixed together and heated at a temperature of from about 91° to 124° C. and under reduced pressure to distill off a mixture of water and the mixed polypropylene glycol butyl ether out of the reaction zone. The heating was carried out over a period of about 21 hours and at a pressure of from 4.4 to 5.9 inches. The mixed polypropylene glycol butyl ether was then separated from the accumulated mixture of water and glycol butyl ether and returned to the reaction zone. The resulting mixture was thereafter placed under reduced pressure and heated for 20 hours at a pot temperature of about 130° C. Upon completion of the reaction, the mixture was neutralized with ammonium bicarbonate and filtered. As a result of the above operations, there was obtained a mixed ester product consisting essentially of the 1-butoxy-2-propyl, butoxy - propoxy - propyl and butoxy - propoxy-propoxy-propyl esters of 4-chloro-o-toloxyacetic acid. This product was an oily liquid having a refractive index $n/D$ of 1.4928 at 25° C.

In a similar manner, other esters of 4-chloro-o-toloxyacetic acid may be prepared of which the following are representative.

The 1-butoxy-2-propyl ester of 4-chloro-o-toloxyacetic acid by reacting together 4-chloro-o-toloxyacetic acid and 1-butoxy-2-propanol.

The 1-phenoxy-2-propyl ester of 4-chloro-o-toloxyacetic acid by reacting together 4-chloro-o-toloxyacetic acid and 1-phenoxy-2-propanol.

The butoxy-propoxy-propoxy-propyl ester of 4-chloro-o-toloxyacetic acid by reacting together 4-chloro-o-toloxyacetic acid and butoxy-propoxy-propoxy-propanol.

The phenoxy-propoxy-propoxy-propyl ester of 4-chloro-o-toloxyacetic acid by reacting together 4-chloro-o-toloxyacetic acid and phenoxy-propoxy-propoxy-propanol.

I claim:

1. An ester of 4-chloro-o-toloxyacetic acid of the formula

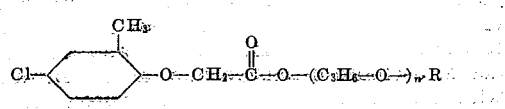

wherein $n$ is an integer not greater than 3, and

R represents a member of the group consisting of alkyl and phenyl.

2. The butoxy-propoxy-propyl ester of 4-chloro-o-toloxyacetic acid.

3. The phenoxy-propoxy-propyl ester of 4-chloro-o-toloxyacetic acid.

4. The methoxy-propoxy-propoxy-propyl ester of 4-chloro-o-toloxyacetic acid.

5. The isopropoxy-propoxy-propyl ester of 4-chloro-o-toloxyacetic acid.

LOUIS E. BEGIN.

References Cited in the file of this patent

UNITED STATES PATENTS

| Number | Name | Date |
|---|---|---|
| 2,523,187 | Britton et al. | Sept. 19, 1950 |
| 2,562,855 | Britton et al. | July 31, 1951 |

OTHER REFERENCES

Newman, Soil Sci. Soc. Am. Proc. 12, 217–21 (1947).